United States Patent
Tanaka

(10) Patent No.: US 8,339,644 B2
(45) Date of Patent: Dec. 25, 2012

(54) PRINTER DRIVER, PRINTER DRIVER PROGRAM RECORDING MEDIUM, PRINT DATA IMPORTING DEVICE, PRINT DATA IMPORTING PROGRAM RECORDING MEDIUM, AND INSTALLER RECORDING MEDIUM

(75) Inventor: Yoshiaki Tanaka, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 924 days.

(21) Appl. No.: 12/385,670

(22) Filed: Apr. 15, 2009

(65) Prior Publication Data

US 2009/0262392 A1    Oct. 22, 2009

(30) Foreign Application Priority Data

Apr. 16, 2008    (JP) ................... 2008-107146

(51) Int. Cl.
*G06F 15/00*    (2006.01)
*G06F 3/12*    (2006.01)
*G06K 1/00*    (2006.01)

(52) U.S. Cl. ...................... 358/1.15; 358/1.13

(58) Field of Classification Search ............... None
See application file for complete search history.

(56) References Cited

U.S. PATENT DOCUMENTS

2009/0180133 A1*  7/2009  Yamamoto ............... 358/1.13

FOREIGN PATENT DOCUMENTS

| JP | 11-065795 | 3/1999 |
| JP | 2007-148578 | 6/2007 |
| JP | 2007-200067 | 8/2007 |

* cited by examiner

*Primary Examiner* — Douglas Tran
(74) *Attorney, Agent, or Firm* — Edwards Wildman Palmer LLP; George W. Neuner

(57) ABSTRACT

One embodiment of a printer driver according to the present invention includes a document data obtaining means for obtaining document data indicated by a received print instruction, a conversion means for converting the obtained document data into print data written in page description language, a transmission-use data generation means for obtaining application information indicating an application program that issued the print instruction and inserting the application information into the print data and a transmission means for transmitting the print data into which the application information was inserted to a printer device.

18 Claims, 9 Drawing Sheets

PRINTER DRIVER, PRINTER DRIVER PROGRAM RECORDING MEDIUM, PRINT DATA IMPORTING DEVICE, PRINT DATA IMPORTING PROGRAM RECORDING MEDIUM, AND INSTALLER RECORDING MEDIUM

This application claims priority under 35 U.S.C. §119(a) on Patent Application No. 2008-107146 filed in Japan on Apr. 16, 2008, the entire contents of which are herein incorporated by reference.

BACKGROUND OF THE INVENTION

1. Field of the Invention

The present invention relates to a printer driver that generates print data and transmits the generated print data to a printer device, and to a computer-readable printer driver program recording medium having recorded thereon a printer driver program that causes a computer to perform processing for generating print data and transmitting the generated print data to the printer device.

Further, the present invention relates to a print data importing device used when importing, into the computer, print data that is transmitted to the printer device by the printer driver and recorded in the printer device, and to a computer-readable print data importing program recording medium having recorded thereon a print data importing program that is launched when importing, into the computer, print data that is transmitted to the printer device by the printer driver and recorded in the printer device.

Moreover, the present invention relates to a computer-readable installer recording medium having recorded thereon an installer that causes the computer to perform processing for installing a print data importing program recorded on a print data importing program recording medium, on the computer.

2. Related Art

A typical computer system requires many tools, such as application programs, for performing respective processes, such as, for example, creating a document, displaying, printing, registering/retrieving data in a database, or performing calculations; and input data corresponding to these tools. Normally, the above tools and data are recorded as files in a storage device of the computer, a storage device of another computer connected via a network, or the like, and are read out from the storage device and used when necessary.

A user often performs an operation by selectively using such tools and data. For example, when creating a document, the user selects a document file that was created before, and also launches a word processing application program, performs necessary editing, and creates a new document file. Also, when printing the document in the document file, the user launches a printing application program and transmits the document to a printer. Or, the user launches an e-mail application program and transmits the document to another recipient.

Further, according to the invention disclosed in JP H11-65795A, when a user selects a data area displayed on a display screen, a program retrieval launching means refers to a program control table and retrieves and launches a program corresponding to the selected data area, and data is processed by the program. This enables the program to be launched with ease.

When print data is transmitted from the computer to the printer device, document data and the like is converted into print data written in page description language (PDL), and the print data is outputted to the printer device. The printer device obtains and analyzes the print data, and records the document on recording paper.

Conventionally, print data is used exclusively by printer devices, and is not assumed to be reused on the computer side. Thus, it has been difficult to reuse the print data. For example, even if the print data is passed from the printer device to the computer and an attempt is made to reuse the print data on the computer side, it is not known which application program handled the original document data of the print data, resulting in difficulty in reusing the print data.

According to the invention disclosed in JP H11-65795A, the user selects the data area, and the necessary program is launched due to the selection of the data area. Thus, if the application program that handled the original document data of the print data is unknown, the selection of such data area cannot be properly performed.

SUMMARY OF THE INVENTION

The present invention was achieved in view of the above conventional problems, and it is an object thereof to provide a printer driver that enables a computer to easily handle print data generated for use in a printer device, and a print data importing device.

Another object of the present invention is to provide a printer driver program recording medium having recorded thereon a printer driver program that enables a computer to easily handle print data generated for use in the printer device, a print data importing program recording medium having recorded thereon a print data importing program, and an installer recording medium having recorded thereon an installer.

A printer driver according to the present invention is a printer driver that generates print data and transmits the generated print data to a printer device. The printer driver includes a document data obtaining means for obtaining document data indicated by a received print instruction, a conversion means for converting the obtained document data into print data written in page description language, a transmission-use data generation means for obtaining application information indicating an application program that issued the print instruction and inserting the application information into the print data and a transmission means for transmitting the print data into which the application information was inserted to a printer device.

With this configuration, when document data indicated by a received print instruction is obtained, the obtained document data is converted into print data written in PDL (page description language), application information that indicates an application program that issued the print instruction is obtained, the application information is inserted into the print data, and the print data into which the application information has been inserted is transmitted to the printer device. Accordingly, when the print data is loaded into the computer from a memory in the printer device or an external storage device, the application information inserted in the print data is loaded at the same time. Thus, in the computer, the application program that issued the print instruction can be launched using the application information of the print data, and the print data can be expanded or the original document data can be retrieved and expanded by using the application program.

In the printer driver according to the present invention, the print data may be in the XML paper specification format.

Also, in the printer driver according to the present invention, the application information may include an executable file name of the application program.

Also, in the printer driver according to the present invention, the application information may include version information of the application program.

Also, in the printer driver according to the present invention, the print data may indicate a single printing page in which a plurality of pages have been reduced and arranged.

Also, in the printer driver according to the present invention, the print data may indicate a printing page that has been enlarged/reduced in accordance with the size of recording paper.

Also, the printer driver program recording medium according to the present invention is a computer-readable printer driver program recording medium having recorded thereon a printer driver program that causes a computer to generate print data and perform processing for transmitting the generated print data to a printer device. The printer driver program includes an obtaining step of causing a computer to perform processing for obtaining document data indicated by a received print instruction, a conversion step of causing the computer to perform processing for converting the obtained document data into print data written in page description language, a transmission-use data generation step of causing the computer to perform processing for obtaining application information indicating an application program that issued the print instruction and inserting the application information into the print data and a transmission step of causing the computer to perform processing for transmitting the print data into which the application information was inserted to a printer device.

With this configuration, a printer driver program is recorded on the printer driver program recording medium, and the printer driver program causes the computer to perform processing for, when document data indicated by a received print instruction is obtained, converting the obtained document data into print data written in PDL (page description language); obtaining application information indicating an application program that issued the print instruction; inserting the application information into the print data; and transmitting the print data in which the application information has been inserted to the printer device. Thus, by installing the printer driver program on, for example, a personal computer that a user owns, the aforementioned printer driver according to the present invention can be easily configured.

Also, the print data importing device according to the present invention is a print data importing device used when importing, into a computer, the print data that has been transmitted to a printer device by the printer driver of the aforementioned present invention and stored in the printer device. The print data importing device includes a print data obtaining means for obtaining the print data, a print data analyzing means for extracting application information from the obtained print data and an application launch means for launching the application program indicated by the extracted application information and that is stored in the computer.

Such a print data importing device according to the present invention is configured so as to obtain print data, extract application information from the obtained print data, and launch an application program indicated by the extracted application information. Thus, the application program that issued an instruction to print the original document data of the print data can be easily launched.

Also, the print data importing device according to the present invention may include a first version information obtaining means for obtaining version information of the application program from the extracted application information and a second version information obtaining means for obtaining version information of the application program stored in the computer. The application launch means may launch an application program capable of handling the print data that is different from the application program indicated by the extracted application information in the case where the version information obtained by the first version information obtaining means is newer than the version information obtained by the second version information obtaining means.

There are cases in which, for example, a corresponding application program exists in a personal computer, but the version of the application program is old, while the version of the application program based on the application information of the print data is new. Thus, there is no guarantee that the print data can be handled even if the old version of the application program is launched. With the configuration as described above, another application program capable of handling the print data can be launched in such cases.

Also, in the print data importing device of the present invention, for example, the application program capable of handling the print data that is different from the application program indicated by the extracted application information may be a viewer application program for displaying print data.

The print data importing program recording medium according to the present invention is a computer-readable print data importing program recording medium having recorded thereon a print data importing program that is launched when importing, into a computer, print data that has been transmitted to a printer device by the printer driver of the aforementioned present invention and stored in the printer device. The print data importing program includes a print data obtaining step of causing a computer to perform processing for obtaining the print data, a print data analyzing step of causing the computer to perform processing for extracting application information from the obtained print data and an application launch step of causing the computer to perform processing for launching an application program indicated by the extracted application information and that is stored in the computer.

With this configuration, a print data importing program is recorded on the print data importing program recording medium, and the print data importing program causes the computer to perform processing for obtaining print data from the printer device, extracting application information from the obtained print data, and launching an application program indicated by the extracted application information. Thus, by installing the program on, for example, a personal computer that the user owns, the aforementioned print data importing device according to the present invention can be easily configured.

Also, in the print data importing program recording medium according to the present invention, the print data importing program may include a first version information obtaining step of causing the computer to perform processing for obtaining version information of the application program from the extracted application information and a second version information obtaining step of causing the computer to perform processing for obtaining version information of the application program stored in the computer. In the application launch step, the computer may be caused to perform processing for launching an application program capable of handling the print data that is different from the application program indicated by the extracted application information in the case where the version information obtained in the first version information obtaining step is newer than the version information obtained in the second version information obtaining step.

Also, the installer recording medium according to the present invention is a computer-readable installer recording medium having recorded thereon an installer for causing a computer to perform processing for installing a print data importing program recorded on the print data importing program recording medium according to the aforementioned present invention onto a computer. The installer includes an installing step of causing a computer to perform processing for installing the print data importing program onto the computer and a setting information change step of causing the computer to perform processing for changing setting information of an operating system on the computer so as to associate the print data importing program with a print data file name extension.

If the aforementioned print data importing program according to the present invention is installed on the computer by using the installer recorded on the installer recording medium configured as described above, setting information in the operating system of the computer is changed so as to associate the print data importing program with the print data file name extension. Thus, if the print data importing program installed on the computer is launched, a print data file can be handled using that print data importing program.

DESCRIPTION OF THE PREFERRED EMBODIMENTS

Hereinafter, an embodiment of the present invention will be described with reference to the attached drawings.

Figure 1:
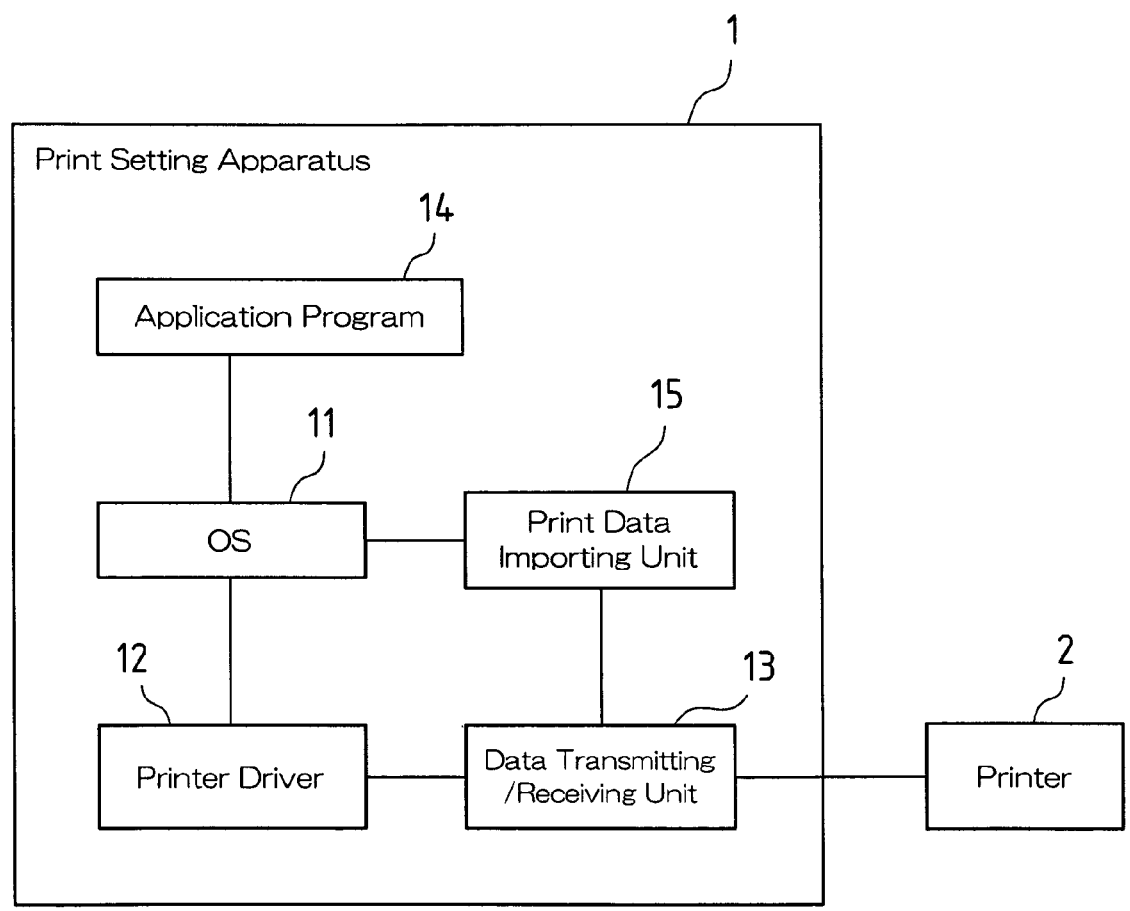
FIG. 1 is a block diagram schematically showing a configuration of a print setting apparatus that includes a printer driver according to an embodiment of the present invention.

FIG. 1 is a block diagram schematically showing a configuration of a print setting apparatus that includes a printer driver according to one embodiment of the present invention.

This print setting apparatus 1 generates a print job including print data and a print setting condition for printing the print data, and outputs the print job to a printer 2 using a hold printer function. When obtaining the print job from the print setting apparatus 1, the printer 2 prints out text and the like, or records the print data in a memory of the printer 2, an external storage device, or the like, in accordance with the print data and print setting condition of the print job.

The print setting apparatus 1 is, for example, a personal computer and has an operating system (hereinafter referred to as an OS) 11; various types of application programs 14; a printer driver 12 for controlling the external printer 2; a data transmitting/receiving unit 13 for transmitting and receiving data to/from the external printer 2; and a print data importing unit 15 used as a print data importing device that is used when print data is imported from the memory of the printer 2 or a storage device into the print setting apparatus 1 (personal computer). The printer driver 12, the data transmitting/receiving unit 13, and the print data importing unit 15 operate via the OS 11.

The printer driver 12 obtains document data handled by the application program 14, and converts this document data into print data. Further, the printer driver 12 obtains print setting conditions set by the application program 14, and transmits a print job consisting of the print data and the print setting conditions from the data transmitting/receiving unit 13 to the printer 2 via a network or the like.

When the printer 2 receives the print job including the print data and the print setting condition, the printer 2 prints a document indicated by the print data onto recording paper and the like, in accordance with the print setting conditions (page orientation, double-sided printing, aggregation, binding, stapling, punching, enlarging/reducing, etc.). In the printer 2, the print job is received by the data transmitting/receiving unit that operates on the OS of the printer 2. Then, a printer command included in the print setting condition of the print job is analyzed, and a document indicated by the print data is printed in accordance with the analysis result. Or, in accordance with the analysis result, the document is not printed, and the print data is recorded in the memory of the printer 2, the external storage device, or the like. Then, a print job name and the print setting condition are displayed on a touch panel-type display device provided in the printer 2. When print execution is instructed through an operation performed by an operator, the printer 2 reads out the print data from the memory of the printer 2, the external storage device, or the like. Subsequently, the printer 2 records the document indicated by the print data on recording paper in accordance with the print setting condition.

Figure 2:
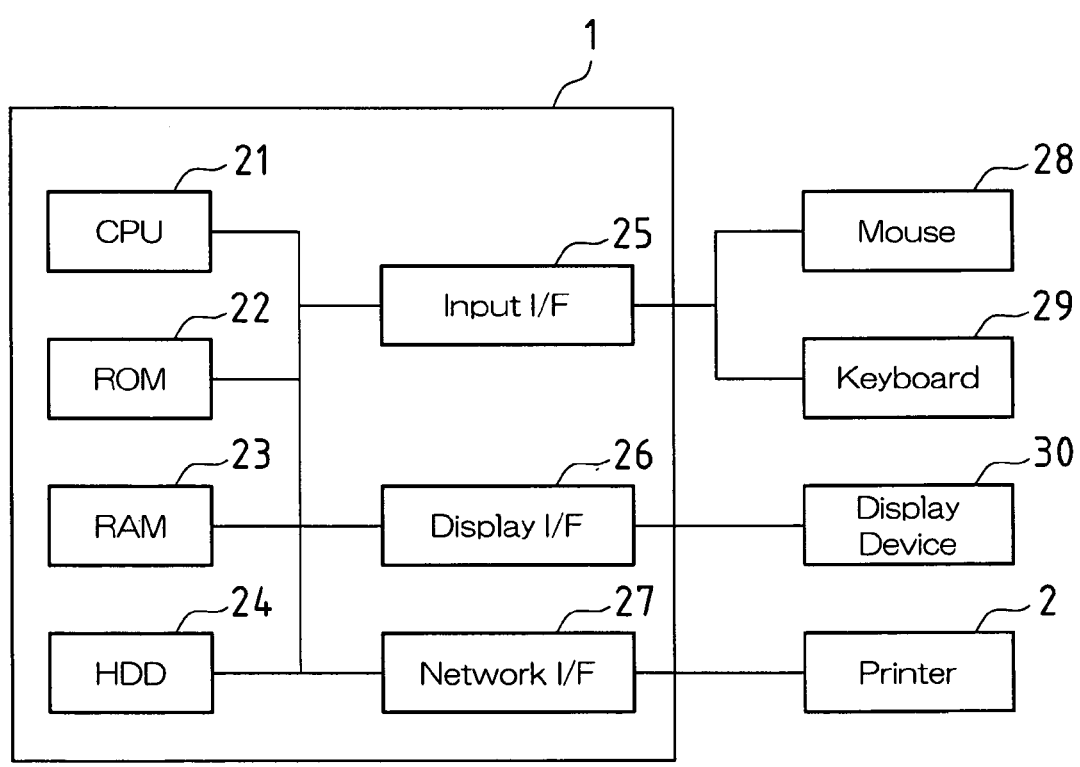
FIG. 2 is a block diagram showing a configuration of the hardware of the print setting apparatus shown in FIG. 1.

FIG. 2 is a block diagram showing a configuration of the hardware of the print setting apparatus shown in FIG. 1. The print setting apparatus 1 includes a central processing unit (hereinafter referred to as a CPU) 21, which performs overall control of the print setting apparatus 1; a ROM 22 for storing various types of programs, data, and the like; a RAM 23, which temporarily stores various types of data and is used as a work area; a hard disk drive (hereinafter referred to as an HDD) 24, which stores various types of programs (application programs, a printer driver program, a print data importing program, etc.), data, and the like; a network interface unit 27 connected to the printer 2 via a network; a display interface unit 26 connected to a display device 30; and an input interface unit 25 connected to a keyboard 29, a pointing device (e.g., mouse) 28, and the like; and so on.

The CPU 21 reads out the OS, application software, and the like from the HDD 24. Based on the operating system, the CPU 21 executes the application software, controls the display on the display device 30 via the display interface unit 26, and obtains data, instructions, and the like from an input device such as the keyboard 29 or the mouse 28 via the input interface unit 25.

Furthermore, the CPU 21 reads out a program (i.e., a printer driver program) for fulfilling a function as a printer driver from the HDD 24 via the OS, executes the printer driver program, and controls the printer 2 via the network interface unit 27.

Moreover, the CPU 21 reads a program (i.e., a print data importing program) for fulfilling a function as a print data importing device from the HDD 24 via the OS, and executes the print data importing program.

Accordingly, the CPU 21 realizes the functions of the operating system 11, the application program 14, the printer driver 12, the print data importing unit 15, and the like.

Figure 3:
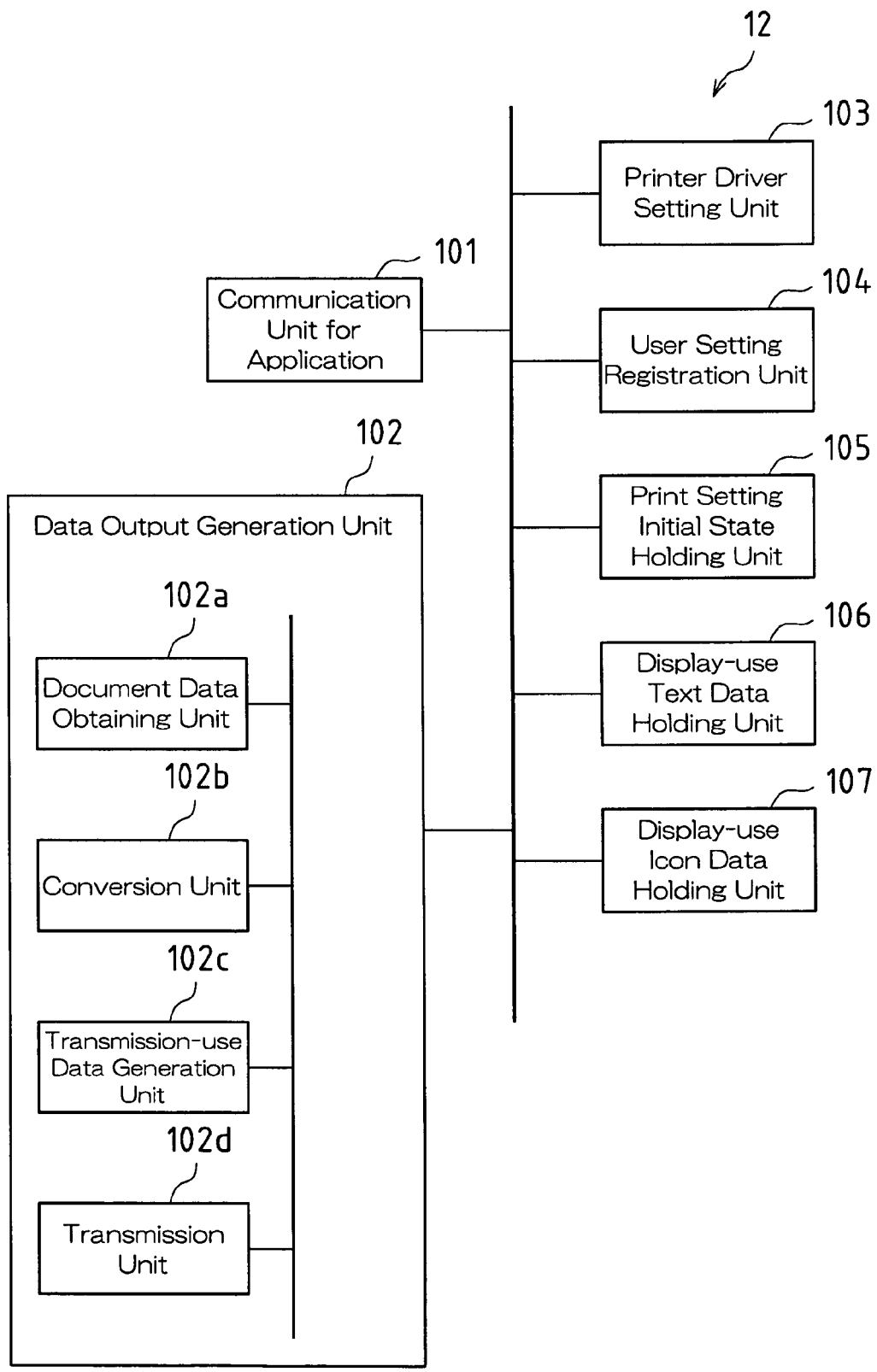
FIG. 3 is a block diagram showing a module configuration of a printer driver that is provided in a print setting apparatus shown in FIG. 1.

FIG. 3 is a block diagram showing a module configuration of the printer driver 12 according to the present embodiment. The printer driver 12 includes a communication unit 101, which performs communication with application programs and processing for obtaining application information; a data output generation unit 102, which generates and outputs print data; a printer driver setting unit 103 for setting print setting conditions; a user setting registration unit 104, in which print setting conditions set by the user are registered; an initial state holding unit 105, which holds the print setting conditions in their initial state; a display-use text data holding unit 106, which holds display-use text data to be displayed on a print setting condition screen and the like; and a display-use icon data holding unit 107, which holds display-use icon data to be displayed on the print setting condition screen and the like. The display-use icon data to be displayed is added to thumbnail images on the print setting condition screen that will be described later.

Next, processing for setting print conditions executed by the printer driver setting unit 103 shall be described with reference to an example of the print setting condition screen generated by the printer driver 12.

The printer driver setting unit 103 reads out the print setting conditions in their initial state, the display-use text data, the display-use icon data, and the like from the initial state holding unit 105, the display-use text data holding unit 106, and the display-use icon data holding unit 107. Then, the printer driver setting unit 103 generates a print setting condition screen using the condition, the text and icon data, and the like, and displays the print setting condition screen on a display screen of the display device 30 via the OS 11 and the display interface unit 26.

The user can set various types of print conditions on the print setting condition screen by inputting an operation using a pointing device such as the keyboard 29 or the mouse 28. Then, each time a setting is inputted, the printer driver setting unit 103 updates the print setting condition screen on the display screen of the display device 30 via the OS 11 and the display interface unit 26.

Figure 4:
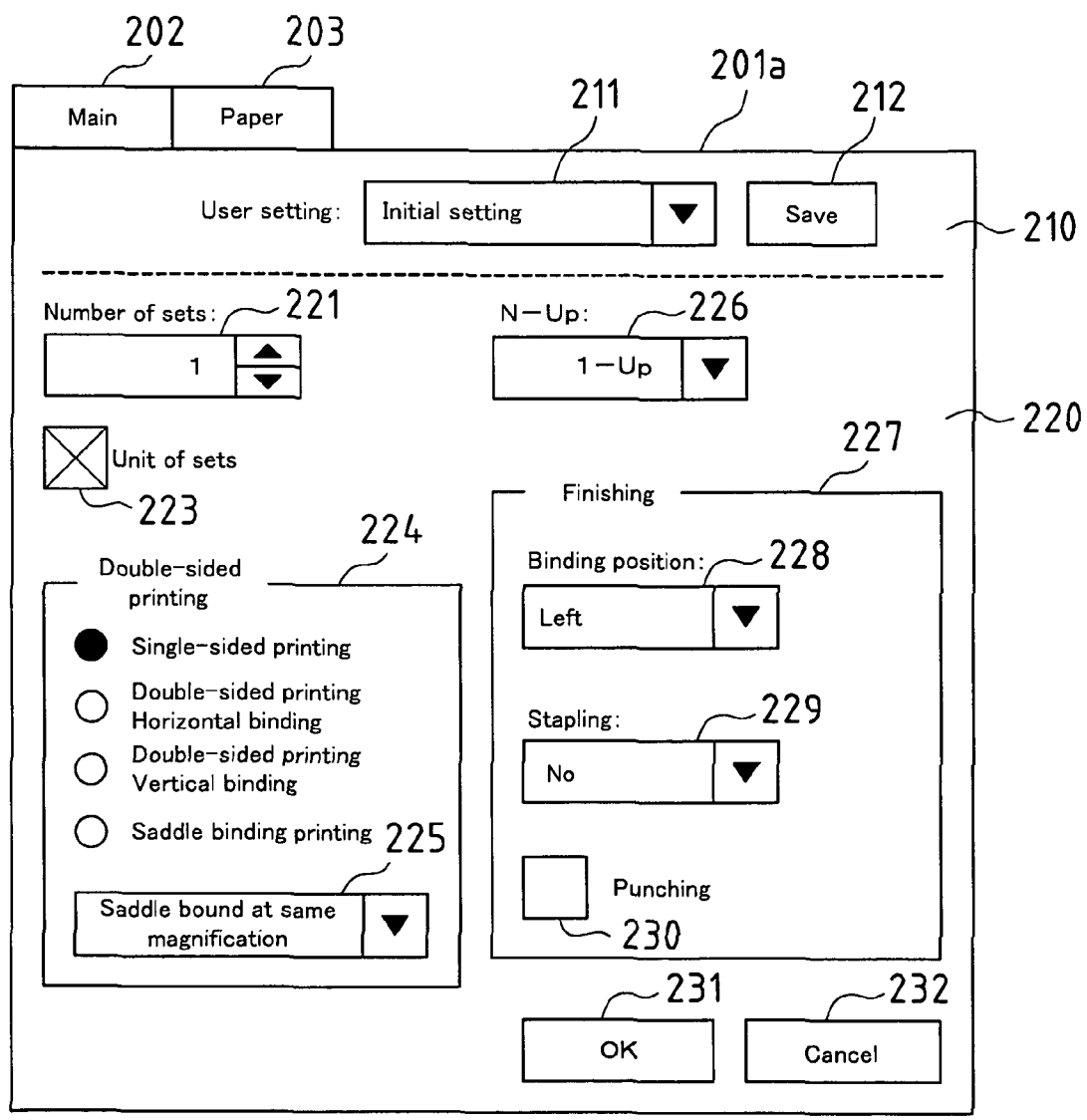
FIG. 4 is a diagram showing one example of a print setting condition screen generated by a printer driver shown in FIG. 3.
Figure 5:
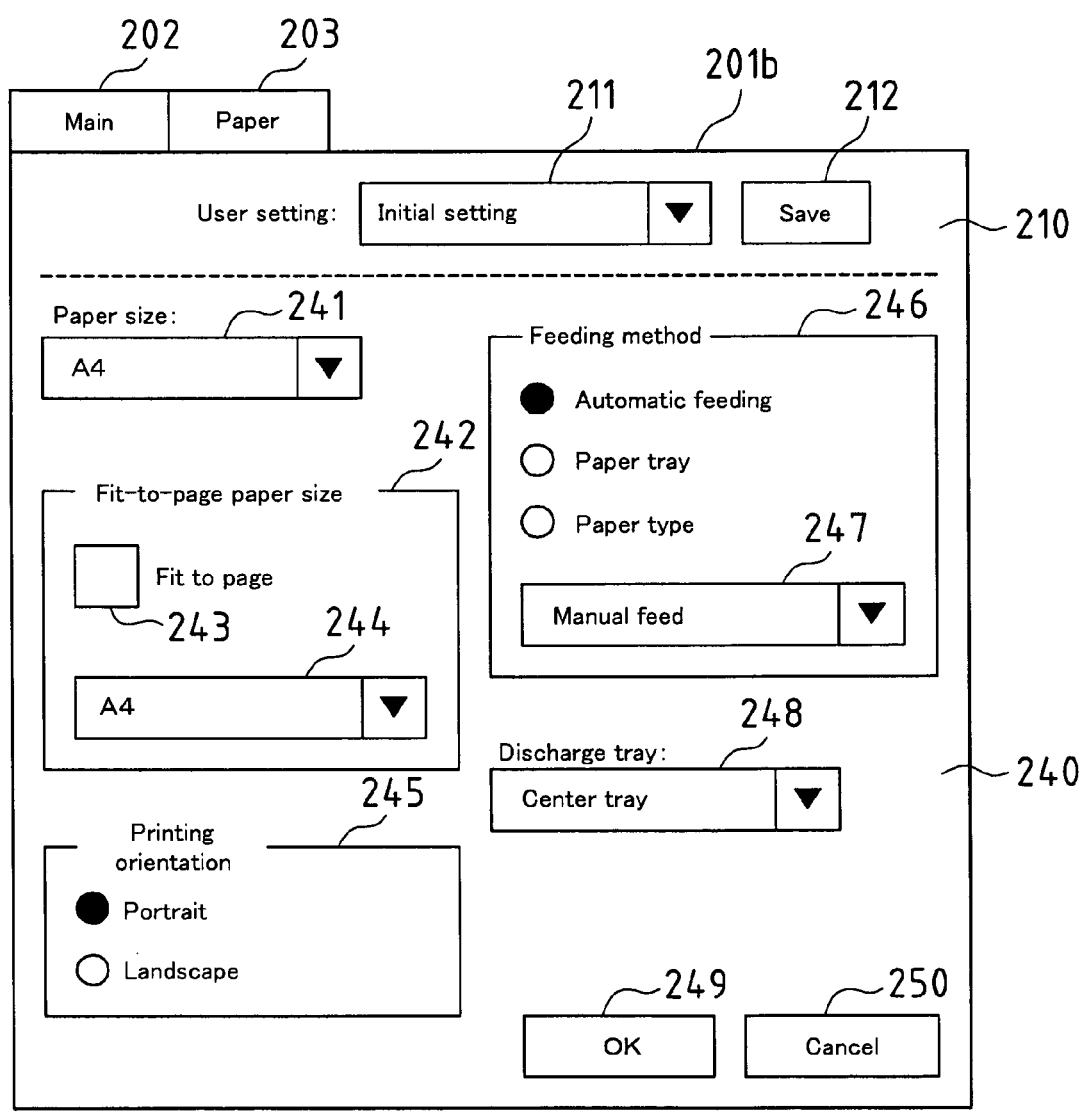
FIG. 5 is a diagram showing another example of a print setting condition screen generated by a printer driver shown in FIG. 3.

FIGS. 4 and 5 are diagrams showing an example of a print setting condition screen. As shown in FIGS. 4 and 5, the display content of the print setting condition screen can be switched. That is, the print setting condition screen includes a main tab 202 and a paper tab 203, and if the user selects either tab by operating a pointing device, such as the mouse, the print setting condition screen of the selected tab is displayed. Here, if the main tab 202 is selected, a print setting condition screen 201a as shown in FIG. 4 is displayed, whereas if the paper tab 203 is selected, a print setting condition screen 201b as shown in FIG. 5 is displayed.

The print setting condition screens 201a and 201b have a user setting area 210, which is common to the screens 201a and 201b, and print setting condition areas 220 and 240, which are respectively set in accordance with the screen under each tab. The common user setting area 210 has a name input portion 211 and a save input portion 212, which are used for naming the setting state of the present print setting condition and enabling the registration thereof.

Also, the print setting condition area 220 of the print setting condition screen 201a under the main tab 202 as shown in FIG. 4 has a number of sets input portion 221 for setting the number of copies/sets in units of pages or sets; a unit of sets input portion 223 for selecting a setting for the unit of sets and the number of sets; a double-sided printing input portion 224 for setting the document style of the document to be printed; an N-Up input portion 226 for printing a plurality of pages onto one sheet of recording paper by shrinking and arranging the pages; and a finishing input portion 227 for making settings for performing stapling, punching, and the like on printed recording paper.

The double-sided printing input portion 224 is provided with a pamphlet style designation area 225, which is used when "pamphlet printing" is selected. Also, the finishing input portion 227 is provided with a binding position input portion 228 for setting which side of the printing paper is to be bound, a stapling input portion 229 for setting whether to staple or not, and a punching input portion 230 for setting whether to punch or not. Moreover, an OK input portion 231 for confirming settings and a cancel input portion 232 for canceling the settings are provided below the print setting condition area 220.

Further, as shown in FIG. 5, the print setting condition area 240 of the print setting condition screen 201b under the paper tab 203 has a size input portion 241 for designating the printing paper size, a fit-to-page paper size input portion 242 for performing a setting for causing the size of the recorded image to fit the size of the recording paper, a printing orientation input portion 245 for setting the orientation of the printing paper, a feeding method input portion 246 for selecting the printing paper, and a discharge tray input portion 248 for setting where the printing paper is discharged to.

The fit-to-page paper size input portion 242 is provided with a check box 243 for activating its function and an area 244 for setting a printing paper size. Also, the feeding method input portion 246 is provided with an area 247 for setting the paper feed tray. Moreover, an OK input portion 249 for confirming settings and a cancel input portion 250 for canceling the settings are provided below the print setting condition area 240.

After print setting conditions have been set in the print setting condition screen, and confirmation is instructed by operating the OK input portions 231 and 249, the printer driver setting unit 103 obtains the confirmed print setting condition. Moreover, when save is instructed by operating the save input portion 212, the printer driver setting unit 103 registers the obtained print setting condition in the user setting registration unit 104.

Figure 6:
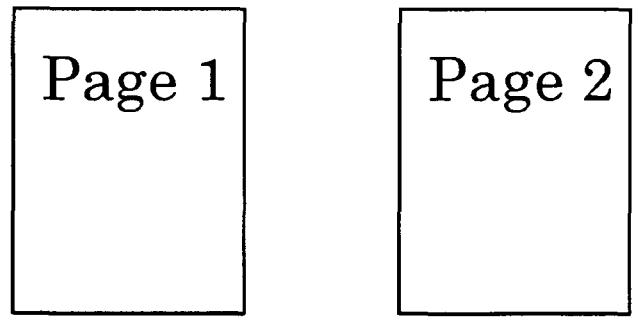
FIG. 6 is a diagram showing one example of a printing image of print data printed in accordance with a print setting condition set by a printer driver shown in FIG. 3.
Figure 7:
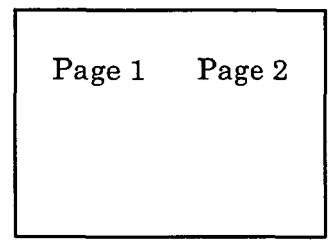
FIG. 7 is a diagram showing another example of a printing image of print data in accordance with a print setting condition set by a printer driver shown in FIG. 3.
Figure 8:
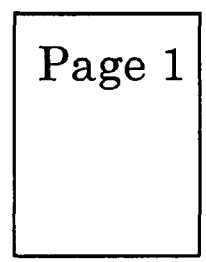
FIG. 8 is a diagram further showing another example of a printing image of print data printed in accordance with a print setting condition set by a printer driver shown in FIG. 3.

FIGS. 6, 7, and 8 illustrate an example of a printing image of print data printed in accordance with the print setting conditions. FIG. 6 shows two pages' worth of printing images. Meanwhile, FIG. 7 shows a printing image when an instruction is given so that, through operations performed by the N-Up input portion 226, two pages are reduced and arranged, and are printed onto one sheet of recording paper. Moreover, FIG. 8 shows a printing image when an instruction is given so that the recorded document size is changed to fit the recording paper size through operations performed by the fit-to-page paper size input portion 242. FIG. 8 shows a printing image made by shrinking an original document indicated by print data in accordance with the recording paper size.

Note that, when a plurality of print setting conditions are combined, a printing image is generated in accordance with these print setting conditions, and the printing image is printed. Further, not all the print setting conditions are executed by the printer 2; rather, part of the conditions are also executed by the printer driver 12, after which the print data is processed.

In the print setting apparatus 1 as described above, an application program is used for creating document data and the like, and an instruction to print the document data is issued by the application program. Next, processing for outputting and generating print data executed by the data output generation unit 102 of the printer driver 12 will be described. Note that, in the present embodiment, as shown in FIG. 3, the data output generation unit 102 is configured to include a document data obtaining unit (document data obtaining means) 102a, a conversion unit (conversion means) 102b, a transmission-use data generation unit (transmission-use data generation means) 102c, and a transmission unit (transmission means) 102d.

When receiving a printing instruction via the communication unit 101, in the data output generation unit 102, the document data obtaining unit 102a obtains document data handled by the application program that issued the printing instruction. Next, the conversion unit 102b converts the document data obtained by the document data obtaining unit 102b into print data written in PDL (page description language). After this, the transmission-use data generation unit 102c obtains application information indicating the application program that issued the printing instruction via the communication unit 101, and generates transmission-use print data by inserting the application information into the print data. Then, the transmission unit 102d transmits the transmission-use print data generated by the transmission-use data generation unit 102c (i.e., the print data into which the application information has been inserted) and the print setting conditions set by the printer driver setting unit 103 to the printer 2 as a print job.

As described above, upon receiving the print job, the printer 2 prints out text and the like in accordance with the print data and print setting conditions of the print job, or records the print data in the memory of the printer 2, an external storage device, or the like.

When the printer 2 records print data in the memory of the printer 2, an external storage device, or the like, the print data can be imported from the memory of the printer 2, the external storage device, or the like into an information processing apparatus such as the print setting apparatus 1 or a personal computer. At this time, the print setting apparatus 1 or the personal computer extracts and reads application information from the imported print data, launches the application program indicated by the application information, and the application program is used for reusing the print data. Accordingly, the print data can be easily processed or handled. For example, the print data can be expanded or the original document data can be retrieved and expanded by using the application program.

Application information is used for specifying an application program, and thus includes an executable file name of the application program and the like. The application information further includes version information of the application program.

As long as the application information can be inserted, the print data may be in any format. For example, the XPS (XML paper specification) format may be used.

In order to import print data held in the memory of the printer 2, an external storage device, or the like into the print setting apparatus 1, an information processing apparatus such as another personal computer that can access to the memory of the printer 2, the external storage device, and the like, the print setting apparatus 1 or the information processing apparatus such as a personal computer is preferably provided with the print data importing unit 15 as the print data importing device shown in FIG. 1.

Figure 9:
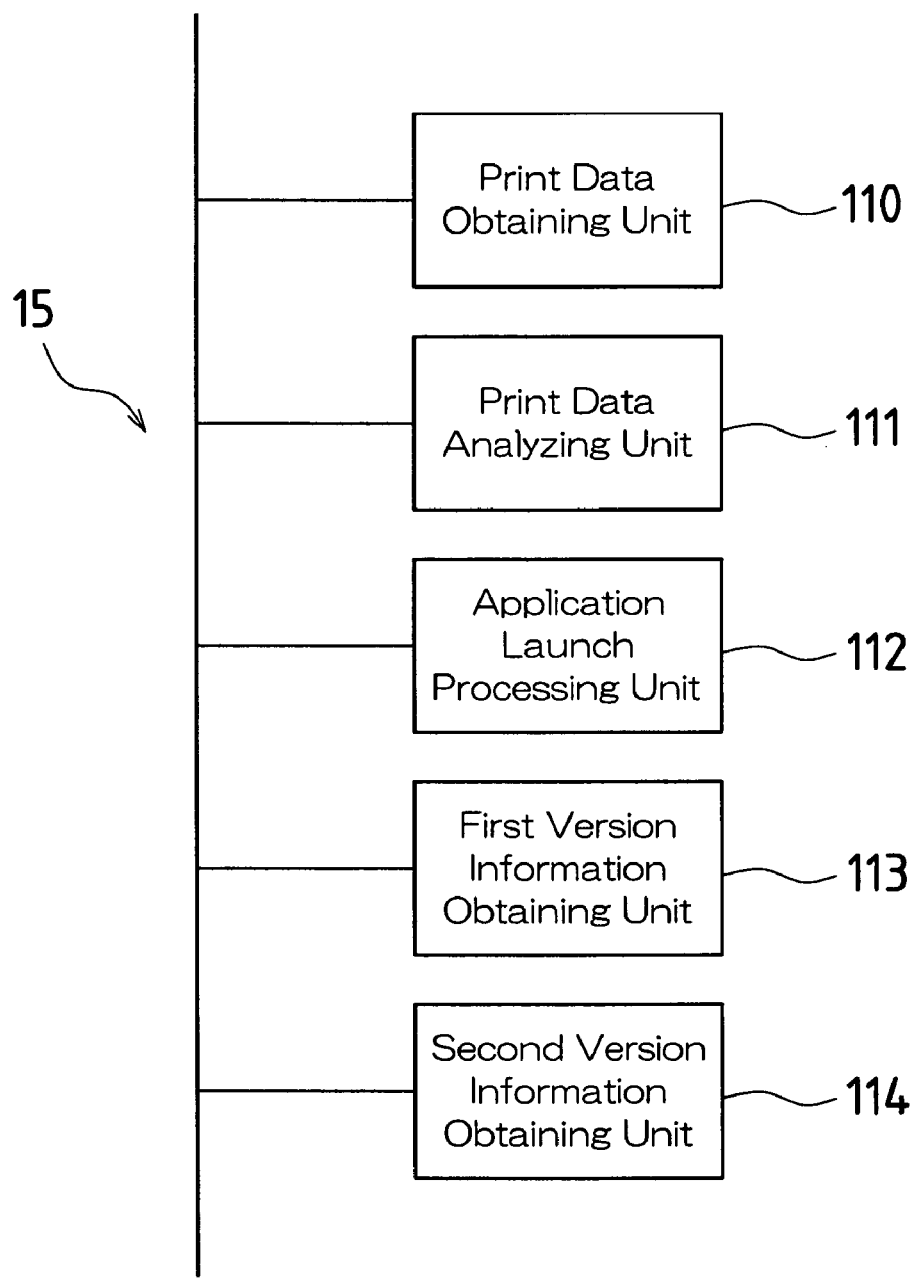
FIG. 9 is a block diagram showing a module configuration of a print data importing device according to an embodiment of the present invention.

FIG. 9 is a block diagram showing a module configuration of the print data importing unit 15 as a print data importing device according to the present embodiment. In FIG. 9, the print data importing unit 15 is configured to include a print data obtaining unit (print data obtaining means) 110, a print data analyzing unit (print data analyzing means) 111, an application launch processing unit (application launch means) 112, a first version information obtaining unit (first version information obtaining means) 113, and a second version information obtaining unit (second version information obtaining means) 114.

The print data importing unit 15 is invoked and launched, for example, when a print file including print data is downloaded from the memory of the printer 2 or the external storage device using a web browser application. First, the print data obtaining unit 110 obtains the print file name of the downloaded print data, and obtains the print data corresponding to the print file name by searching the storage device of the print setting apparatus 1 based on the print file name. Next, the print data analyzing unit 111 extracts the application information inserted in the print data that is, for example, an executable file name and version information of an application program, from the print data obtained by the print data obtaining unit 110. Then, the application launch processing unit 112 launches the application program that is indicated by the application information extracted by the print data analyzing unit 111 and is stored in the print setting apparatus 1 (personal computer). The application program is used for reusing the print data.

Note that, in the present embodiment, the print data importing unit 15 is provided with the first version information obtaining unit 113, which obtains version information of an application program from the application information extracted by the print data analyzing unit 111, and the second version information obtaining unit 114, which obtains version information of the application program stored in the print setting apparatus 1 (personal computer). If the version information obtained by the first version information obtaining unit 113 is newer than the version information obtained by the second version information obtaining unit 114, the application launch processing unit 112 launches an application program capable of handling print data that is different from the application program indicated by the application information extracted by the print data analyzing unit 111.

Next, the flow of processing performed by the printer driver 12 of the print setting apparatus 1 will be described with reference to the flowchart shown in FIG. 10. In this processing, print data is generated, print setting conditions are set, application information that indicates the application program that issued a print instruction is inserted in the print data, and the print data into which the application information has been inserted and the print setting conditions are outputted to the printer 2 as a print job.

First, the printer driver 12 is launched due to receipt of a print instruction from an application program. Then, the printer driver setting unit 103 reads out the print setting conditions in their initial states, display-use text data, display-use icon data, and the like from the initial state holding unit 105, the display-use text data holding unit 106, and the display-use icon data holding unit 107. Next, the printer driver setting unit 103 generates a print setting condition screen using the conditions, the text and icon data, and the like, updates the print setting condition screen in response to an input operation, and obtains and confirms the print setting conditions on the print setting condition screen (step S301). Meanwhile, the data output generation unit 102 obtains document data from an application program via the communication unit 101 using the document data obtaining unit 102a, and converts the document data into print data using the conversion unit 102b (step S302). Moreover, the data output generation unit 102 obtains the executable file name and version information of the application program as application information via the communication unit 101 using the transmission-use data generation unit 102c (step S303).

Next, the data output generation unit 102 processes the print data based on the print setting conditions confirmed by the printer driver setting unit 103 using the transmission-use data generation unit 102c. Here, the data output generation unit 102 judges, using the transmission-use data generation unit 102c, whether or not printing has been instructed so that a plurality of pages are reduced and arranged so as to be printed onto one sheet of recording paper through operations performed by the N-Up input portion 226 (step S304). If such printing has been instructed ("Yes" in step S304), the print data is processed so that the plurality of pages are reduced and arranged so as to be printed onto one sheet of recording paper (step S305). However, if such printing has not been instructed ("No" in step S304), step S305 is skipped and the processing proceeds to step S306. Next, the data output generation unit 102 judges, using the transmission-use data generation unit 102c, whether or not an instruction has been given so that the size of the recorded image is changed to fit the size of the recording paper through operations performed by the fit-to-page paper size input portion 242 (step S306). If such an instruction has been given ("Yes" in step S306), the print data is processed so that the size of the recorded image fits to the size of the recording paper (step S307). However, if such an instruction has not been given ("No" in step S306), step S307 is skipped. By performing such print data processing, the printing image is updated (step S308).

Next, the transmission-use data generation unit 102c of the data output generation unit 102 inserts the application information obtained via the communication unit 101 in step S303 into the print data (step S309).

After that, the transmission unit 102d of the data output generation unit 102 transmits the print data into which the application information was inserted in step S309 and the print setting condition confirmed in step S301 to the printer 2 as a print job (step S310).

As described above, upon receiving a print instruction from an application program, the printer driver 12 of the print setting apparatus 1 obtains document data from the application program, converts the document data into print data, obtains an executable file name and version information of the application program as application information, processes the print data in accordance with print setting information, inserts the application information into the print data, and transmits the print data and the print setting information to the printer 2 as a print job.

Figure 10:
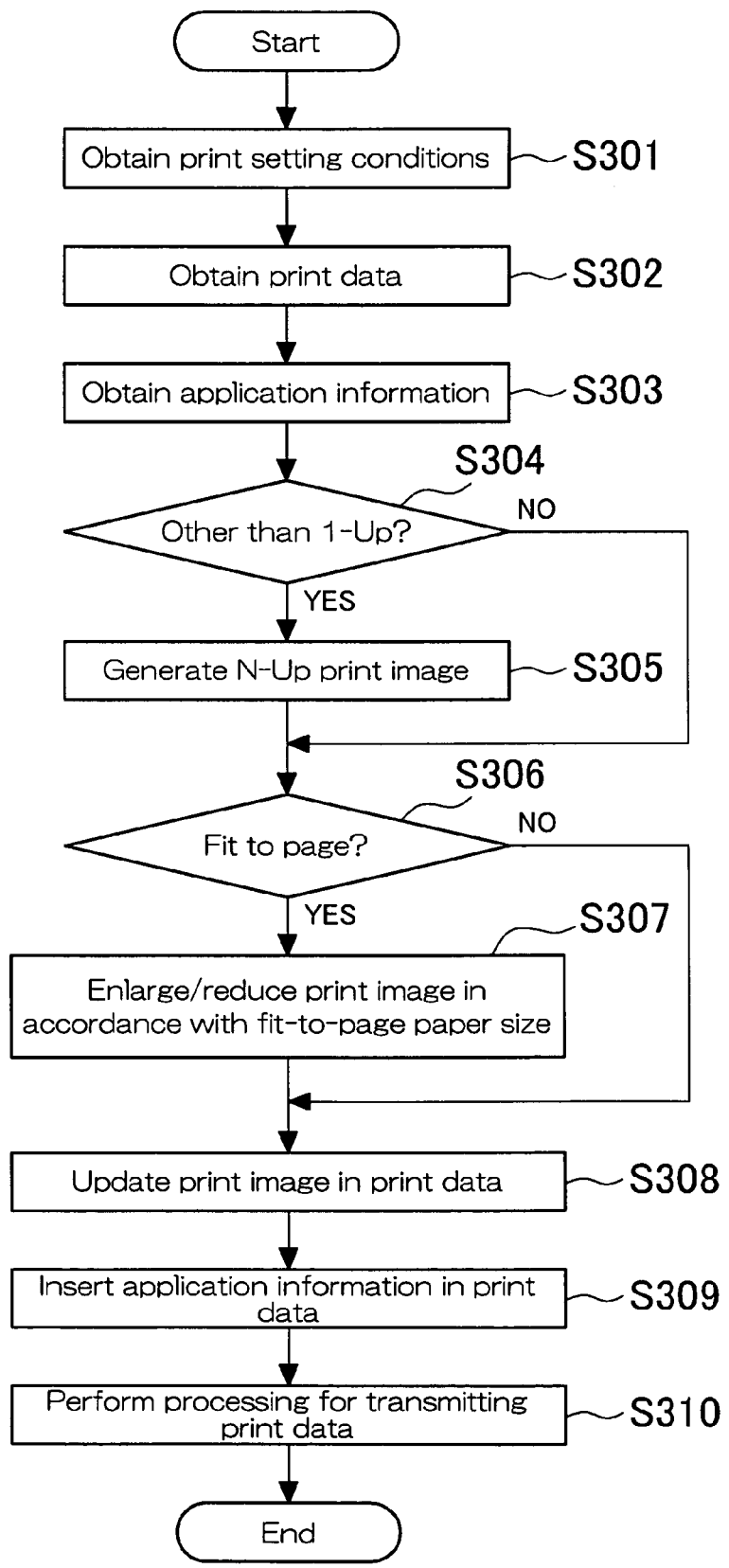
FIG. 10 is a flowchart showing the flow of processing performed by a printer driver according to one embodiment of the present invention.

Note that a program that causes the data output generation unit 102 (computer) and the printer driver setting unit 103 (computer), which are realized by the CPU 21, to perform the aforementioned steps of the processing flow shown in FIG. 10 is stored in a computer-readable recording medium. In the present embodiment, the program is stored in the HDD 24 as a printer driver program. However, examples of such a recording medium include a semiconductor device such as a mask ROM or a flash ROM, a hard disk, a flexible disk, a CD-ROM, a DVD-ROM, a BD-ROM, a magneto optical disk, a smart card (IC card), and magnetic tape, and any such recording medium may be applied as long as that recording medium can record a computer program. Also, although it is not shown, the recording medium may be realized as a program medium used to read a program by providing a program reader as the external storage device and inserting a recording medium into the program reader. In any case, the stored printer driver program is preferably configured to be executed by being accessed by the CPU 21 (computer).

In the printer 2, when a print job is inputted, the print setting conditions of the print job are analyzed, and the document indicated by the print data is printed in accordance with the analysis result. Or, in accordance with the analysis result, the document is not printed, and the print data is instead recorded in the memory of the printer 2, an external storage device, or the like. Then, when print execution is instructed by an operation performed by an operator from the printer 2 side, the print data is read out from the memory of the printer 2, the external storage device, or the like, and the document indicated by the print data is recorded onto recording paper in accordance with the print setting conditions.

Next, the flow of processing performed by the print setting apparatus 1 (personal computer) will be described with reference to a flowchart shown in FIG. 11. In the processing, the print data importing unit 15 is launched, and print data held in the memory of the printer 2, an external storage device, or the like is imported.

First, in the print setting apparatus 1 (personal computer), for example, when print data is downloaded from the memory of the printer 2 or the external storage device by using a web browser application, the print data importing unit 15 shown in FIG. 9 is launched. When the print data importing unit 15 launches, the print data obtaining unit 110 obtains the file name of the downloaded print data (step S401), and the print data corresponding to the file name is obtained by searching the storage device of the print setting apparatus 1 based on the obtained file name (step S402).

Next, the print data analyzing unit 111 extracts and obtains application information that is, for example, application information such as an executable file name and version information of an application program from the print data, and moreover, the first version information obtaining unit 113 obtains version information from the extracted application information (step S403). Further, the application launch processing unit 112 judges whether or not the application program corresponding to the executable file name indicated by the application information exists in the print setting apparatus 1 (personal computer) (step S404).

For example, if the application program corresponding to the executable file name indicated by the application information obtained in step S403 exists in the print setting apparatus 1 (personal computer) ("Yes" in step S404), the application launch processing unit 112 causes the second version information obtaining unit 114 to obtain the version information of the application program corresponding to the executable file name that exists in the print setting apparatus 1 (personal computer) (step S405). The version information obtained by the second version information obtaining unit 114 is then compared to the version information extracted from the print data by the first version information obtaining unit 113 in step S403 (step S406). If the former version information is the same as or newer than the latter version information ("No" in step S406), the application launch processing unit 112 launches the application program that exists in the print setting apparatus 1 (personal computer) corresponding to the executable file name indicated by the application information obtained in step S403 (step S407). This enables the print setting apparatus 1 (personal computer) to use the application program so as to reuse the print data, and the print data can be easily processed or handled.

Meanwhile, if the application program corresponding to the executable file name indicated by the application information obtained in step S403 does not exist in the print setting apparatus 1 (personal computer) ("No" in step S404), the application program cannot be launched. Thus, the application launch processing unit 112 launches a print data viewer application program that has been prepared in advance as an alternative, and the print data is displayed on the screen of the display device of the print setting apparatus 1 (personal computer) (step S408).

In case of the version information obtained by the second version information obtaining unit 114 in step S405 being older than the version information extracted from the print data by the first version information obtaining unit 113 in step S403 ("Yes" in step S406), even if the application program corresponding to the executable file name indicated by the application information obtained in step S403 that exists in the print setting apparatus 1 (personal computer) is launched, there is no guarantee that the print data can be handled using that application program. Thus, the alternative viewer application program is launched, and the print data is displayed on the screen of the display device (step S408).

As described above, the print setting apparatus 1 (personal computer) has a built-in print data importing device (print data importing unit 15) that is configured to obtain application information from print data when the print data is downloaded from the memory of the printer 2 or an external storage device, and to launch the application program, stored in the print setting apparatus 1 (personal computer), that is indicated by the application information. Thus, the print data can be easily processed or handled. Also, if an application program does not exist or the application program is old, the alternative viewer application program is launched, and the print data can be displayed on the screen of the display device.

Note that, in the present embodiment, if an application program indicated by application information extracted from print data does not exist in the print setting apparatus 1 (personal computer), or if the version of the application program that exists in the print setting apparatus 1 (personal computer) is older than the version of the application program indicated by the application information extracted from the print data, a viewer application is launched, but processing such as displaying a warning message may be performed instead.

Figure 11:
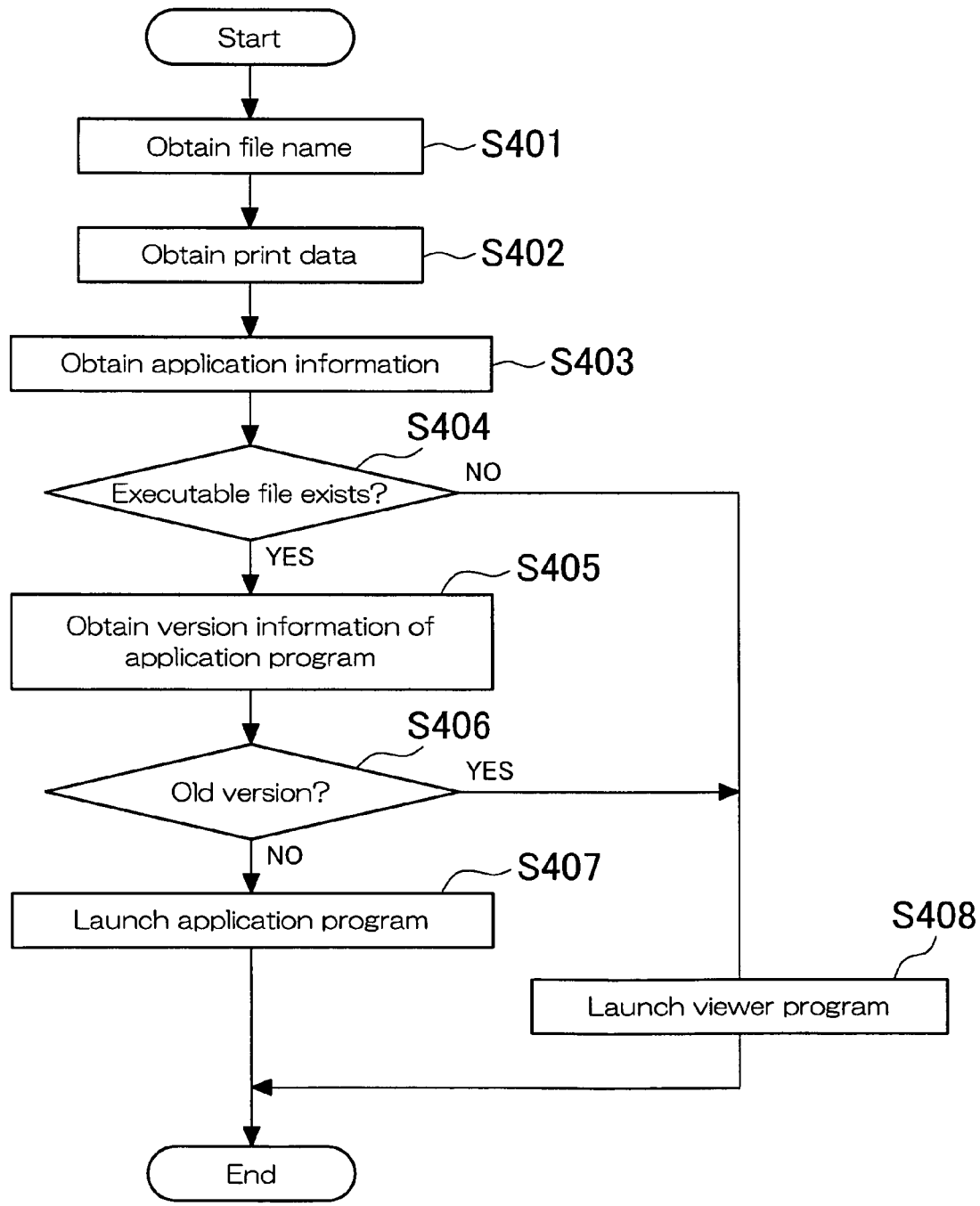
FIG. 11 is a flowchart showing the flow of processing performed by a print data importing device according to one embodiment of the present invention.

Note that a program that causes the print data importing unit 15 (computer) realized by the CPU 21 to perform the aforementioned steps of the processing flow shown in FIG. 11 is stored in a computer-readable recording medium. In the present embodiment, the program is stored in the HDD 24 as a print data importing program. However, examples of such a recording medium include a semiconductor device such as a mask ROM or a flash ROM, a hard disk, a flexible disk, a CD-ROM, a DVD-ROM, a BD-ROM, a magneto optical disk, a smart card (IC card), and magnetic tape, and any such recording medium may be applied as long as that recording medium can record a computer program. Also, although it is not shown, the recording medium may be realized as a program medium used to read a program by providing a program reader as the external storage device and inserting a recording medium into the program reader. In any case, the stored print data importing program is preferably configured to be executed by being accessed by the CPU 21 (computer).

Also, when installing a print data importing program, data specifying a program associated with the print data file extension that can be used as a print data importing program is preferably registered in the OS of the print setting apparatus 1 or a personal computer. As a specific example, an installer of the print data importing program for installing the print data importing program onto the computer preferably includes an installing step of causing the computer to perform processing for installing the print data importing program onto the computer and a setting information change step of causing the computer to perform processing for changing setting information of the operating system of the computer so as to associate the print data importing program with the print data file name extension. This enables the print data importing unit 15 to be launched automatically and reliably based on the extension of the print data file when the print data is imported.

Note that the installer described above is provided having been stored in a computer-readable recording medium. Examples of such a recording medium include a semiconductor device such as a mask ROM or a flash ROM, a hard disk, a flexible disk, a CD-ROM, a DVD-ROM, a BD-ROM, a magneto optical disk, a smart card (IC card), and magnetic tape, and any such recording medium may be applied as long as that recording medium can record a computer program.

Moreover, in order to easily install the print data importing program, a printer driver program recorded in a printer driver recording medium may include a print data importing program.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A printer driver that generates print data and transmits the generated print data to a printer device, the printer driver comprising:
    a document data obtaining means for obtaining document data indicated by a received print instruction;
    a conversion means for converting the obtained document data into print data written in page description language;
    a transmission-use data generation means for obtaining application information indicating an application program that issued the print instruction and inserting the application information into the print data; and
    a transmission means for transmitting the print data into which the application information was inserted to a printer device.

2. A printer driver that generates print data and transmits the generated print data to a printer device, the printer driver comprising:
    a document data obtaining means for obtaining document data indicated by a received print instruction;
    a conversion means for converting the obtained document data into print data written in XML paper specification format;

a transmission-use data generation means for obtaining application information indicating an application program that issued the print instruction and inserting the application information into the print data; and a transmission means for transmitting the print data into which the application information was inserted to a printer device.

3. The printer driver according to claim 1,
wherein the application information includes an executable file name of the application program.

4. The printer driver according to claim 1,
wherein the application information includes version information of the application program.

5. The printer driver according to claim 1,
wherein the print data indicates a single printing page in which a plurality of pages have been reduced and arranged.

6. The printer driver according to claim 1,
wherein the print data indicates a printing page that has been enlarged/reduced in accordance with the size of recording paper.

7. A computer-readable printer driver program non-transitory recording medium having recorded thereon a printer driver program that causes a computer to generate print data and perform processing for transmitting the generated print data to a printer device, the printer driver program comprising:

an obtaining step of causing a computer to perform processing for obtaining document data indicated by a received print instruction;

a conversion step of causing the computer to perform processing for converting the obtained document data into print data;

a transmission-use data generation step of causing the computer to perform processing for obtaining application information indicating an application program that issued the print instruction and inserting the application information into the print data; and a transmission step of causing the computer to perform processing for transmitting the print data into which the application information was inserted to a printer device.

8. A print data importing device used when importing, into a computer, print data that has been transmitted to a printer device by the printer driver according to claim 1 and stored in the printer device, the print data importing device comprising:

a print data obtaining means for obtaining the print data;

a print data analyzing means for extracting application information from the obtained print data; and an application launch means for launching an application program indicated by the extracted application information and that is stored in the computer.

9. The print data importing device according to claim 8 comprising:

a first version information obtaining means for obtaining version information of the application program from the extracted application information; and a second version information obtaining means for obtaining version information of the application program stored in the computer, wherein the application launch means launches an application program capable of handling the print data that is different from the application program indicated by the extracted application information in the case where the version information obtained by the first version information obtaining means is newer than the version information obtained by the second version information obtaining means.

10. The print data importing device according to claim 9,
wherein the application program capable of handling the print data that is different from the application program indicated by the extracted application information is a viewer application program for displaying print data.

11. A computer-readable print data importing program non-transitory recording medium having recorded thereon a print data importing program that is launched when importing, into a computer, print data that has been transmitted to a printer device by the printer driver according to claim 1 and stored in the printer device, the print data importing program comprising:

a print data obtaining step of causing a computer to perform processing for obtaining the print data;

a print data analyzing step of causing the computer to perform processing for extracting application information from the obtained print data; and an application launch step of causing the computer to perform processing for launching the application program indicated by the extracted application information and that is stored in the computer.

12. The print data importing program non-transitory recording medium according to claim 11, the print data importing program comprising:

a first version information obtaining step of causing the computer to perform processing for obtaining version information of the application program from the extracted application information; and a second version information obtaining step of causing the computer to perform processing for obtaining version information of the application program stored in the computer, wherein in the application launch step, the computer is caused to perform processing for launching an application program capable of handling the print data that is different from the application program indicated by the extracted application information in the case where the version information obtained in the first version information obtaining step is newer than the version information obtained in the second version information obtaining step.

13. A computer-readable installer non-transitory recording medium having recorded thereon an installer for causing a computer to perform processing for installing a print data importing program recorded on the print data importing program recording medium according to claim 11 or 12 onto a computer, the installer comprising:

an installing step of causing a computer to perform processing for installing the print data importing program onto the computer; and a setting information change step of causing the computer to perform processing for changing setting information of an operating system on the computer so as to associate the print data importing program with a print data file name extension.

14. A computer comprising:
a printer driver that generates print data and transmits the generated print data to a printer device; and
a print data importing unit used when importing the print data that has been stored in the printer device,
wherein the printer driver comprises:
a document data obtaining means for obtaining document data indicated by a received print instruction;
a conversion means for converting the obtained document data into print data written in page description language;
a transmission-use data generation means for obtaining application information indicating an application program that issued the print instruction and inserting the application information into the print data; and a transmission means for transmitting the print data into which the application information was inserted to the printer device, and the print data importing unit comprises:

a print data obtaining means for obtaining the print data;

a print data analyzing means for extracting the application information from the obtained print data; and an application launch means for launching the application program indicated by the extracted application information and that is stored in the computer.

15. The computer according to claim 14,
wherein the application information includes an executable file name of the application program.

16. The computer according to claim 14,
wherein the application information includes version information of the application program.

17. The computer according to claim 14,
wherein the print data indicates a single printing page in which a plurality of pages have been reduced and arranged.

18. The computer according to claim 14,
wherein the print data indicates a printing page that has been enlarged/reduced in accordance with the size of recording paper.

\* \* \* \* \*